Oct. 25, 1932.                    G. F. NYE                    1,884,151
                              THRESHING MACHINE
                              Filed June 9, 1930
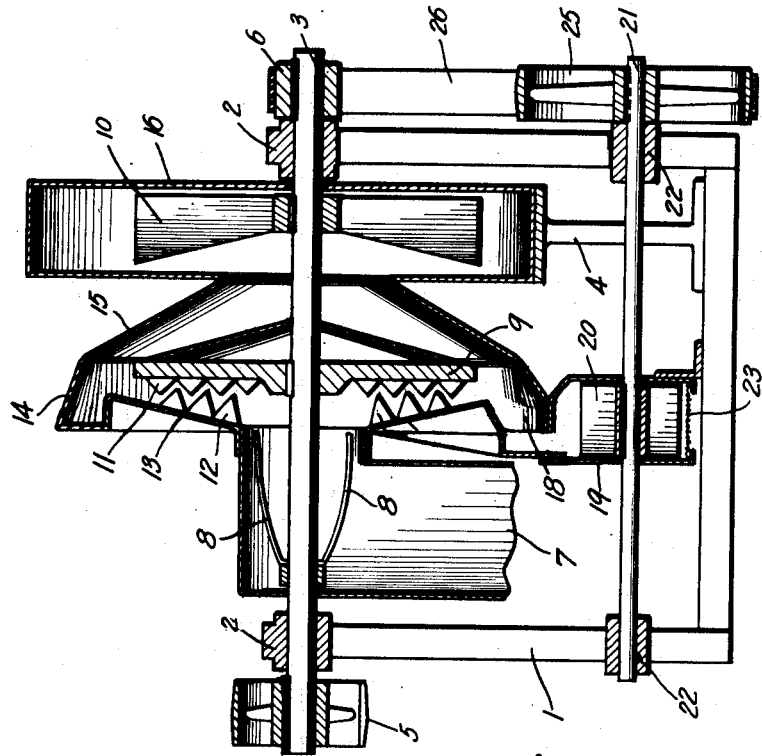
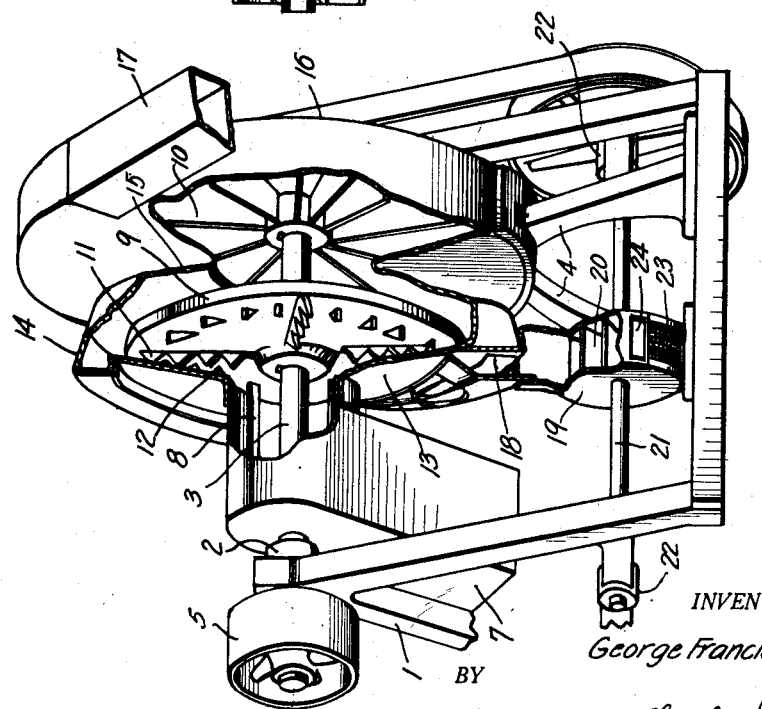
INVENTOR.
George Francis Nye
BY
Thos. E. Scofield
ATTORNEY.

Patented Oct. 25, 1932

1,884,151

UNITED STATES PATENT OFFICE

GEORGE FRANCIS NYE, OF KEARNEY, NEBRASKA

THRESHING MACHINE

Application filed June 9, 1930. Serial No. 459,857.

This invention relates to improvements in a combined threshing and separating assembly in which a grain crop is threshed and the chaff and straw separated from the grain kernels. The assembly provides for the separation of the grain kernels and means for separately discharging the grain kernels and the chaff and straw from the assembly.

It is contemplated that a combined threshing and separating assembly may be used as a stationary machine or may be mounted as a unit upon a combine harvester or can be used separately as a threshing and separating unit, mounted upon a portable platform such as a truck.

Among the novel features of the invention are the simplicity of the mechanism, the fact that grain can be threshed and separated in a single unit, utilizing a disk thresher and air exhaust fan for discharging the chaff and straw, greatly reducing the power requirements for the work to be done. Further advantages lie in the fact that the high velocity given to the grain kernels by the centrifugal force is utilized to assist in separating the grain kernels from the chaff and straw.

Particular attention is directed to the creation of an air draft through the casing which surrounds the threshing mechanism and fan, and the sloping of the surface of the casing which lies beyond the periphery or circumference of the threshing disk in a direction that the grain kernels acquiring velocity by centrifugal force will be directed so that their travel is substantially opposed to the current of air created by the fan and in which the lighter chaff and straw is drawn.

Fig. 1 is a perspective view of the assembly with parts broken away.

Fig. 2 is a side sectional elevation.

Referring to the drawing, the assembly is supported by means of a triangular or tripod standard 1, upon which are mounted the bearings 2 which support the shaft 3. A separate standard 4 supports the fan casing. At opposite ends of the shaft are pulleys 5 and 6. The shaft is driven from any suitable source of power, by means of the pulley 5. This pulley, however, may be replaced by a direct-connected motor or other suitable source of power, such as an internal combustion engine.

The crop to be threshed is supplied through the inlet pipe or duct 7 which feeds the crop parallel to the axis of the shaft into the threshing mechanism. Within the duct 7 are arms 8 which serve to advance the crop into the threshing mechanism. Mounted upon the shaft is a threshing disk 9 and an exhaust fan 10. The threshing disk has arranged upon its front face or surface a plurality of projections or teeth 11 which are aligned with similar teeth 12 affixed to the inside of the casing 13 so that the crop supplied to the threshing portion of the assembly will be rapidly rotated between the adjacent teeth so that the chaff, straw and grain kernels are threshed. The fan 10, rotating with the shaft and the threshing disk 9, creates an air draft or suction which draws the crop through the threshing stage. The threshing disk rotating the crop at high velocity imparts a high lineal velocity to the threshed materials. Due to the difference in weight of the chaff and straw relative to the grain kernels, the latter maintaining the velocity actuated by the centrifugal force of the disk are projected onto a forwardly inclined surface 14 which lies directly in the path of the grain projected from the periphery or circumference of the threshing disk. The chaff and straw, being of relatively lighter weight, is less affected by the centrifugal force of the threshing disk, so that the air current or suction draft created by the fan takes effect more readily thereupon and changes the direction of the chaff and straw to follow the air current along the conical shaped surface 15, which directs the chaff and straw into the suction inlet of the fan. The fan is surrounded by a casing 16 wherein the chaff and straw is rapidly rotated as it is drawn through the inlet and is discharged through the exhaust or discharge duct 17.

The grain kernels projected from the threshing disk flow along the forwardly inclined surface 14 and pass through an arcuate slot 18 shown in Fig. 1, which opening at the bottom of the casing communicates with the grain discharger. This grain discharger consists of a casing 19 in which is rotating a paddle wheel device 20 mounted upon a shaft 21 which is supported by bearings 22 mounted upon a standard 1. The grain accumulating between the paddles of the wheel 20 is moved around and out through the screen 23, which is of sufficiently wide mesh to permit the passage of the grain kernels therethrough. The heavier pieces of débris, straw knuckles or pieces of weeds which, due to their weight, were projected with the grain from the threshing disk, are eliminated through the port or opening designated by the numeral 24 above the grain screen 23.

On the end of the shaft 21 is mounted a pulley 25 which is driven by a belt 26 from the pulley 6 on the shaft 3. Thus the entire assembly is driven from the shaft 3 with but one secondary belt connection 26.

The separated kernels of grain can be accumulated in any suitable collecting means, not shown. The chaff and straw can likewise be piped off to be discharged as desired.

It is appreciated also that innumerable changes may be made in the driving mechanism or in the arrangement of the threshing and fan connection, without departing from the spirit or scope of the invention. The simplicity of the device and the low manufacturing cost make the device attractive to farmers who desire to limit the capital cost of equipment to a minimum.

The unit, when mounted on a combine, would greatly reduce the necessary equipment to accomplish the threshing and separating operation.

It is appreciated that, heretofore, threshing has been accomplished by a disk of this character and a fan has been used for discharging the straw and chaff. In my previously issued Patent No. 1,670,273, a device of this character was shown. The present arrangement, however, permits the more complete separation of the grain from the chaff and straw by utilizing the velocity of the grain kernels as they are projected from the threshing disk to more effectively remove and separate the grain from the deleterious materials by inclination of the surface on to which the grain kernels are projected so that the direction of the grain kernels is changed so that it substantially opposes the travel of the air draft, which carries by suction the chaff and straw to the fan.

I claim as my invention:

A centrifugal threshing machine comprising in combination a housing, a shaft rotatably mounted in said housing, a member mounted for rotation with said shaft provided with threshing elements, said member adapted to throw the threshed material in a plane substantially perpendicular to the axis of said shaft, a duct at one end of said housing adapted to lead the crop to said member, a suction fan mounted within said housing at the other end thereof adapted to create an air stream through said housing of sufficient velocity to overcome the momentum of the chaff, while insufficient to effect that of the grain, said housing being formed with an inclined surface extending from said plane of centrifugal force forwardly toward said crop inlet to said housing in a direction opposite to the air travel through the housing and a grain outlet duct communicating with said inclined surface.

In testimony whereof I affix my signature.

GEORGE FRANCIS NYE.